(12) United States Patent
Nitschmann et al.

(10) Patent No.: US 11,098,741 B2
(45) Date of Patent: Aug. 24, 2021

(54) DOUBLE CONNECTOR FOR BUTT-JOINING TWO PARTS

(71) Applicant: Häfele GmbH & Co KG, Nagold (DE)

(72) Inventors: Gunter Nitschmann, Pfalzgrafenweiler (DE); Lory Arnold, Zug (CH)

(73) Assignee: Häfele GmbH & Co KG, Nagold (DE)

( * ) Notice: Subject to any disclaimer, the term of this patent is extended or adjusted under 35 U.S.C. 154(b) by 417 days.

(21) Appl. No.: 16/168,140

(22) Filed: Oct. 23, 2018

(65) Prior Publication Data

US 2019/0055973 A1    Feb. 21, 2019

Related U.S. Application Data

(63) Continuation of application No. PCT/EP2016/076990, filed on Nov. 8, 2016.

(30) Foreign Application Priority Data

Apr. 25, 2016  (DE) ............... 20 2016 102 176.6

(51) Int. Cl.
| | |
|---|---|
| *F16B 12/24* | (2006.01) |
| *F16B 12/26* | (2006.01) |
| *F16B 5/00* | (2006.01) |
| *F16B 13/12* | (2006.01) |

(52) U.S. Cl.
CPC ............ *F16B 12/24* (2013.01); *F16B 5/0024* (2013.01); *F16B 12/26* (2013.01); *F16B 13/128* (2013.01); *A47B 2230/0033* (2013.01)

(58) Field of Classification Search
CPC .... A47B 2230/0033; A47B 2230/0037; A47B 2230/004; A47B 2230/0051; A47B 2230/14; A47B 2095/006; F16B 2/04; F16B 2/243; F16B 5/0027; F16B 5/0076; F16B 5/0614; F16B 12/20; F16B 12/24; F16B 12/26; F16B 12/36; F16B 12/38; F16B 13/06; F16B 13/063; F16B 13/0833; F16B 13/28; F16B 2012/103; F16B 2013/10;
(Continued)

(56) References Cited

U.S. PATENT DOCUMENTS 4,093,389 A * 6/1978 Wibrow .................. F16B 19/00
403/297
4,299,515 A * 11/1981 Yates .................. E21D 21/0093
405/259.1
(Continued)

FOREIGN PATENT DOCUMENTS

| CN | 14299998 A | 7/2003 |
|---|---|---|
| CN | 102439321 A | 5/2012 |

(Continued)

*Primary Examiner* — Josh Skroupa
(74) *Attorney, Agent, or Firm* — Hackler Daghighian Martino & Novak

(57) ABSTRACT

A double connector for butt-joining two components includes two connector components which can be pushed together as far as a locked assembly position and which each have an spreadable first end portion for inserting into a hole of a component, and a second end portion for spreading the first end portion of the other connector component in each case in the assembly position and at least one locking portion for interlocking the two connector components in the assembly position.

15 Claims, 4 Drawing Sheets

(58) Field of Classification Search
CPC ... F16B 5/0024; Y10T 403/557; Y10T 403/73
USPC .... 403/297, 403, DIG. 10, DIG. 11, DIG. 13
See application file for complete search history.

(56) References Cited

U.S. PATENT DOCUMENTS

| | | | | |
|---|---|---|---|---|
| 4,380,407 | A | * | 4/1983 | Donan, Jr. ............ E21D 21/008 |
| | | | | 405/259.3 |
| 4,789,284 | A | * | 12/1988 | White .................. F16B 13/066 |
| | | | | 405/259.3 |
| 5,161,916 | A | * | 11/1992 | White .................. E21D 21/008 |
| | | | | 405/259.4 |
| 5,531,792 | A | * | 7/1996 | Huene .................... A61B 17/68 |
| | | | | 623/23.47 |
| 6,299,397 | B1 | | 10/2001 | Mengel |
| 6,848,855 | B2 | | 2/2005 | Haesler |
| 8,685,096 | B2 | * | 4/2014 | Davenport ............ A61F 2/4455 |
| | | | | 623/17.11 |
| 9,161,624 | B2 | | 10/2015 | Haemmerle |
| 10,094,408 | B2 | | 10/2018 | McClure |
| 2012/0301217 | A1 | | 11/2012 | Liu et al. |

FOREIGN PATENT DOCUMENTS

| | | | |
|---|---|---|---|
| CN | 103281933 | A | 9/2013 |
| DE | 32 45 948 | A1 | 6/1984 |
| DE | 295 12 775 | U1 | 10/1995 |
| FR | 1 546 888 | A | 11/1968 |
| JP | H09217720 | A | 8/1997 |

\* cited by examiner

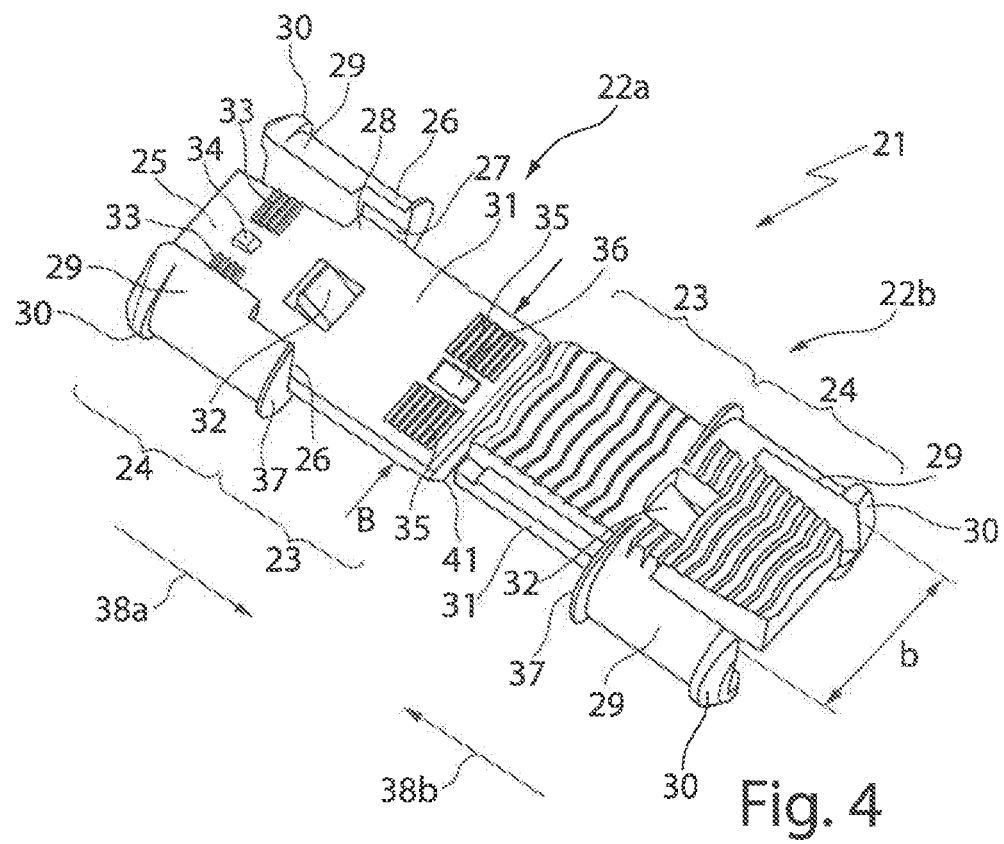
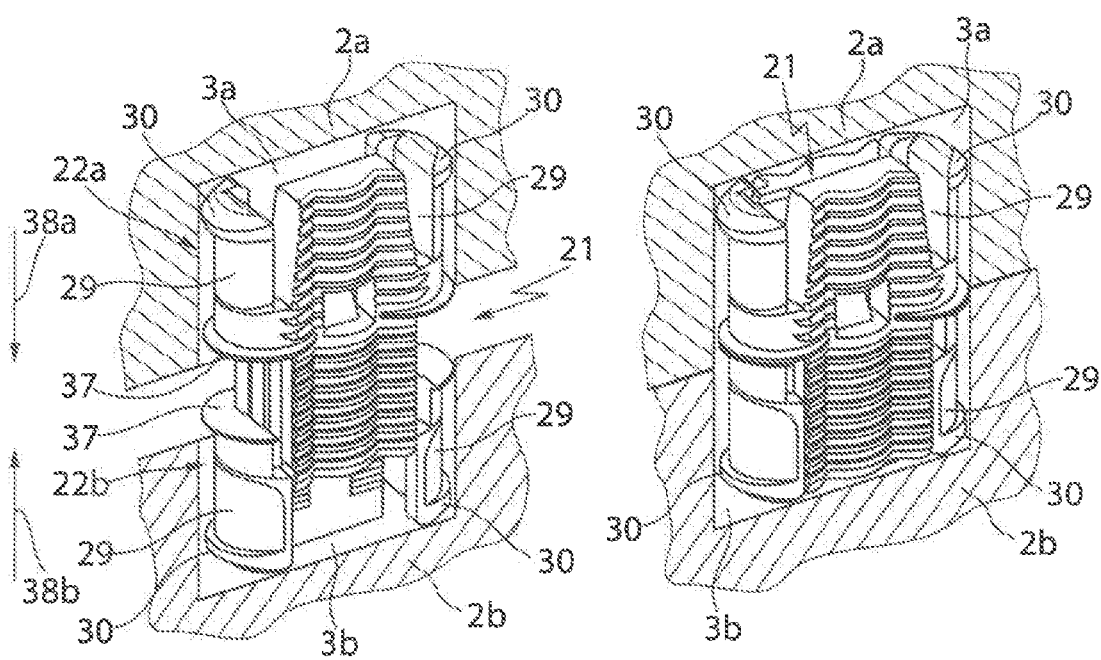

DOUBLE CONNECTOR FOR BUTT-JOINING TWO PARTS

CROSS-REFERENCE TO RELATED APPLICATIONS

This continuation application claims priority to PCT/EP2016/076990 filed on Nov. 8, 2016 which has published as WO 2017/186318 A1 and also the German application number 20 2016 102 176.6 filed on Apr. 25, 2016, the entire contents of which are fully incorporated herein with these references.

DESCRIPTION

Field of the Invention

The invention relates to a double connector for butt-joining two components and an arrangement having such a double connector.

BACKGROUND OF THE INVENTION

In order to butt-join two furniture components, there are known, for example, eccentric connection fittings in which a pin is screwed into one furniture component and a rotatable cam is inserted into a hole of the other furniture component. Using a tool, the cam is rotated and the pin is thereby tightened until the two furniture components are in abutment with each other.

SUMMARY OF THE INVENTION

In this regard, an object of the present invention is to provide a connector by means of which two components, such as, for example, two furniture plates can be secured to each other in a tool-free and invisible manner. In addition, the connector is always intended to sit in the center of the plates regardless of the plate thickness.

This object is achieved according to the invention with a double connector for butt-joining two components comprising two connector components which can be pushed together as far as a locked assembly position and which each comprise a spreadable first end portion for inserting into a hole of a component, a second end portion for spreading the first end portion of the other connector component in each case in the assembly position and at least one locking portion for interlocking the two connector components in the assembly position.

According to the invention, the first end portions of the two connector components are each inserted into the holes of the components and spread therein outward by the second end portions of the connector components which have been pushed together. In the assembly position, the connector components are, on the one hand, securely anchored by the spread first end portions in the hole walls of the components and, on the other hand, secured against being pushed back by the connector components which are locked together. Preferably, the two connector components are constructed in a structurally identical manner. The two connector components move synchronously with respect to each other, which has the advantage that the path during the final assembly is halved since the individual components move synchronously with respect to each other. As a result of the preferably identical components, an assembly independent of position is also possible, that is to say, the end user cannot incorrectly assemble the preassembled double connector.

The double connector according to the invention may be used universally to connect any two components which may also be different, for example, in the furniture sector to connect two furniture components or in automotive or medical technology.

In a preferred first variant of the invention, the two connector components are each formed as a U-shaped clamp having two outer clamp arms which can be spread with respect to each other and having a central clamp arm which is located therebetween, wherein the thickness of the central clamp arm transversely with respect to the spreading direction of the two outer clamp arms is greater than the clear spacing of the two free clamp ends.

The two clamps in a state rotated through 90° with respect to each other with the free clamp ends of one clamp are inserted one into the other between the free clamp ends of the other clamp, advantageously beyond the subsequent assembly position as far as an engaged preassembly position, in which the free clamp ends of one clamp in the insertion direction thereof protrude beyond the central clamp arm of the other clamp in each case. In this preassembly position, the two clamps are prefixed relative to each other (transport safety) and, when the components are pushed together, are pushed together from the preassembly position back into the assembly position.

In a particularly preferred manner, each clamp has, at the outer sides of the two outer clamp arms facing away from each other, an outer shoulder which limits the insertion of the outer clamp arms into the hole of the component, wherein the outer spacing of the two clamp arms starting from the outer dimension of the central clamp arm continuously increases as far as the outer shoulder. The two clamp arms with their increasing outer diameter are compressed on entering the hole to the hole diameter, whereby the edge collars are also moved radially inward until they ideally completely disappear ("disappearing edge scanning").

Preferably, each clamp has at the outer sides of the two free clamp arms facing away from each other at least one transverse rib for pressing into the hole wall.

The two clamps may be produced as separate components or, in a particularly advantageous manner, as a single injection-molded component in which the two clamps at the end sides of the two free clamp ends thereof are connected integrally to each other by means of a predetermined breaking point.

In a preferred second variant of the invention, the two connector components are each formed as a plug component which comprises at one end a plug portion and at the other end a plug receiving portion having a guide channel and two side flaps which protrude inward into the guide channel and which can be spread with respect to each other, wherein the plug portions of the two plug components can each be inserted into the guide channel of the other plug component.

The two plug components in a state turned through 180° with respect to each other are inserted one into the other with the plug portions thereof into the guide channel of the other plug component, advantageously as far as a locked preassembly position from which the two plug components can then be pushed further together as far as the assembly position. In this preassembly position, the two plug components are prefixed with respect to each other (transport safety) and, when the components are pushed together, are pushed further together from the preassembly position as far as the assembly position.

In a particularly preferred manner, the two plug components are locked in the preassembly position in the insertion direction, for example, by means of a locking spring, and are displaced transversely with respect to each other in such a manner that the introduction of the plug portions into the guide channel of the other plug component in each case is blocked. In order to release this blocking, the plug portions have at the front end thereof in the insertion direction an outer chamfer which in the preassembly position protrudes over the plug receiving portion of the other plug component in the transverse direction. When the double connector is inserted, the plug portions each enter with the chamfered introduction member the holes, whereby the two plug components are compressed in the transverse direction to the hole diameter and the plug portions can thereby be introduced further into the guide channel of the other plug component in each case as far as the assembly position.

Preferably, each plug component has at the outer sides of the side flaps thereof facing away from each other at least one transverse rib for pressing into the hole wall.

Preferably, the connector components are filled with glue which is then pressed out when the connector components are pushed together.

Finally, the invention also relates to an arrangement comprising two mutually abutting components and a double connector constructed as above, wherein the first end portions of the two connector components are each inserted into an intersecting multiple hole of the components and, at the long side, are spread outward therein by the second end portions of the connector components which have been pushed together. No pressure is thereby produced in the transverse direction (plate thickness) so that no buckling, for example, of high-gloss-lacquered chipboard occurs when the connector is inserted at the end face.

Other advantages of the invention will be appreciated from the description, the claims and the drawings. The features mentioned above and those set out below can also be used individually or together in any combinations. The embodiments shown and described are not intended to be understood to be a definitive listing but instead are of exemplary nature in order to describe the invention.

BRIEF DESCRIPTION OF THE DRAWINGS

In the drawings:

FIG. 4 shows a second embodiment of the double connector according to the invention with two plug-like connector components in the state not yet inserted one into the other;

FIGS. 5a, 5b show the double connector shown in FIG. 4 with the two connector components inserted one inside the other in a preassembly position (FIG. 5a) and in a locked assembly position (FIG. 5b)

DETAILED DESCRIPTION OF THE PREFERRED EMBODIMENTS

Figure 1:
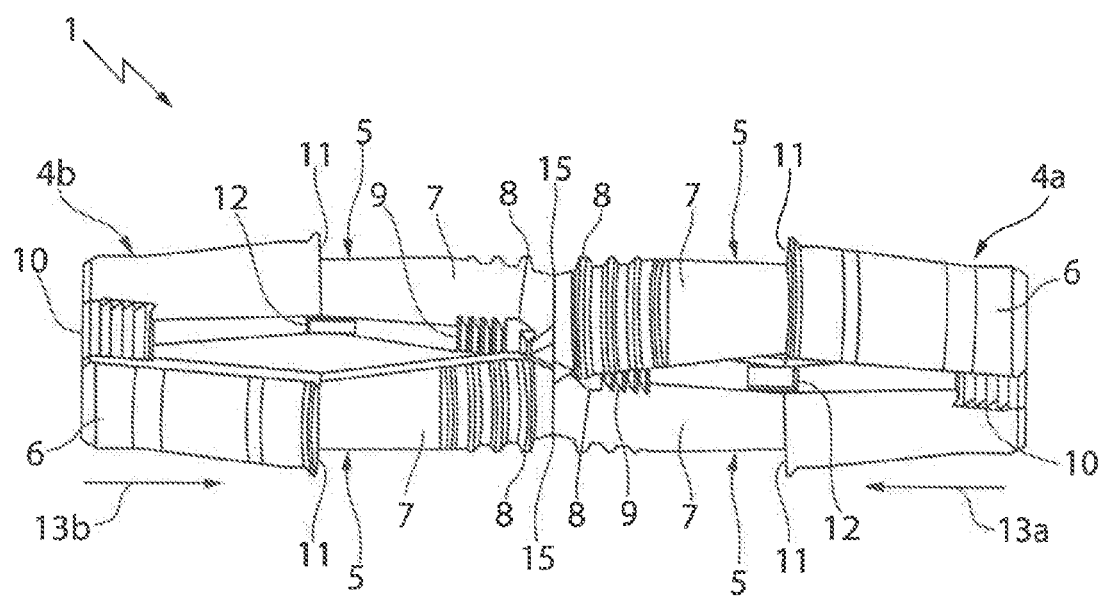
FIG. 1 shows a first embodiment of the double connector according to the invention with two U-shaped clamp connector components in the state not yet inserted one into the other.

In the following description of the figures, identical reference numerals are used for components which are identical or functionally identical.

The double connector 1 shown in FIGS. 1 and 2 serves to butt-join two furniture components 2a, 2b which abut against each other in a planar manner and which each have a receiving hole 3a, 3b.

The double connector 1 comprises two connector components in the form of U-shaped clamps 4a, 4b which in the embodiment shown are constructed in a structurally identical manner, but which may also be constructed differently. The two clamps 4a, 4b each have two outer clamp arms 5 which can be spread with respect to each other and a central clamp arm 6 which is located therebetween. The free clamp ends 7 of the two outer clamp arms 5 form the first spreadable end portion and the central clamp arm 6 forms the other second end portion of the connector components. The thickness D (FIG. 3a) of the central clamp arm 6 transversely relative to the spreading direction of the two outer clamp arms 5 is greater than the clear spacing d of the two free clamp ends 7.

The two free clamp ends 7 have at the outer sides thereof facing away from each other a plurality of claw-like transverse ribs 8 and at the inner sides thereof facing each other a plurality of transversely extending inner catches 9. The central clamp arm 6 has at the two transverse sides thereof facing away from each other a plurality of transversely extending outer catches 10. Alternatively, only a single outer catch 10 may also be provided. Approximately at midlength, the clamp arms 5 have at the outer sides thereof facing away from each other an outer shoulder 11 which is constructed as an edge collar and at the inner sides thereof facing each other a locking step 12. The outer diameter (outer spacing) of the two clamp arms 5 increases from the outer diameter (outer dimension) of the central clamp arm 6 as far as the outer shoulder 11 continuously to an outer diameter (outer spacing) which is greater than the hole diameter of the hole 2a, 2b and subsequently returns to the outer diameter (outer spacing) of the free clamp ends 7 which is identical over the entire length of the free clamp ends 7 and which approximately corresponds to the outer diameter of the central clamp arm 6.

Figures 2A, 2B:
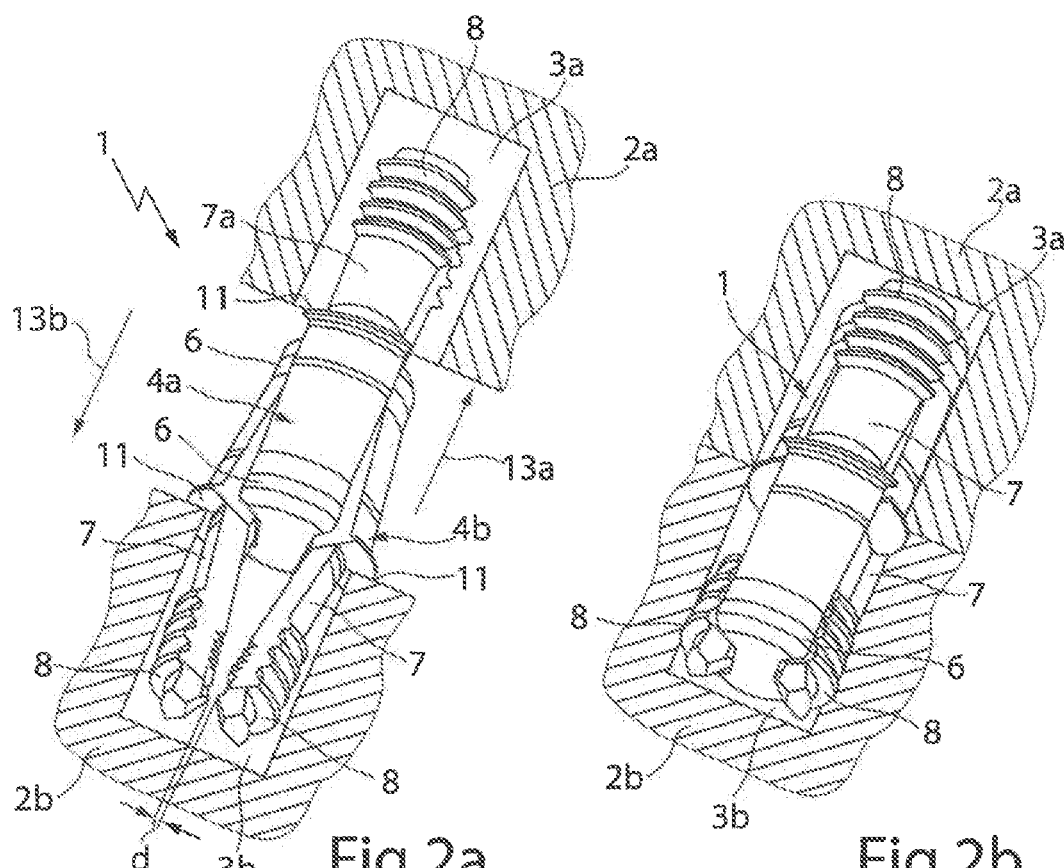
FIGS. 2a, 2b show the double connector shown in FIG. 1 with the two connector components inserted one into the other in a preassembly position (FIG. 2a) and in a locked assembly position (FIG. 2b)
Figure 3A:
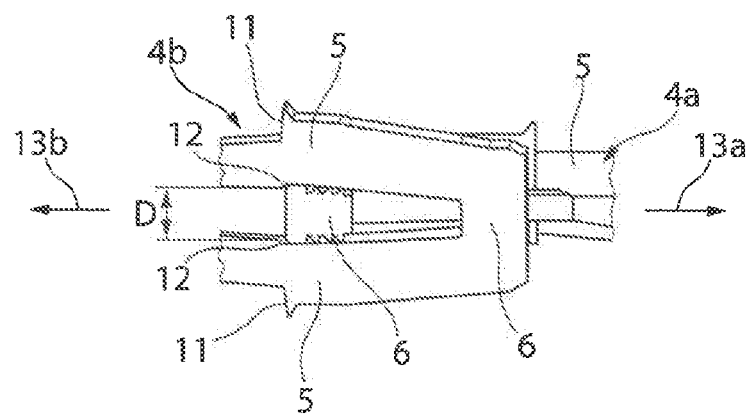
FIGS. 3a-3c are detailed views of the two connector components inserted one in the other of FIGS. 2a, 2b in the preassembly position (FIG. 3a), in the locking position (FIG. 3b) and during the initial insertion of the two connector components one into the other, as a longitudinal section in each case.

With the free clamp ends 7 thereof facing each other and rotated through 90° relative to each other (FIG. 1), the two clamps 4a, 4b are inserted one into the other with the free clamp ends 7 of one clamp 4a, 4b between the free clamp ends 7 of the other clamp 4b, 4a in the insertion direction 13a or 13b, respectively—beyond the subsequent assembly position—as far as a preassembly position (FIG. 2a). In this preassembly position, the free clamp ends 7 of one clamp 4a, 4b protrude in the insertion direction 13a, 13b thereof over the central clamp arm 6 of the other clamp 4b, 4a, respectively. As shown in FIG. 3a in detail, in the preassembly position the central clamp arms 6 are engaged in the two locking steps 12 of the other clamp 4a, 4b, respectively, and thereby prefixed with respect to each other and secured against being unintentionally pushed together.

As further shown in FIG. 2a, this preassembled double connector 1 is first inserted with the two free clamp ends 7 of one clamp 4a into the hole 3a of one furniture component 2a and then with the two free clamp ends 7 of the other clamp 4b into the hole 3b of the other furniture component 2b until the clamps 4a, 4b abut with the outer shoulders 11 thereof against the furniture components 2a, 2b. That is to say, the holes 3a, 3b are deeper than the free clamp ends 7 of the clamps 4a, 4b to be inserted therein so that the outer shoulders 11 form a depth stop which limits the insertion.

Finally, the two furniture components 2a, 2b are pushed together until in mutual abutment and the two clamps 4a, 4b are thereby pushed together from the preassembly position counter to their original insertion direction 13a, 13b into the assembly position thereof (FIG. 2b). When the two clamps 4a, 4b are pushed together, the central clamp arms 6 are initially unlocked from the locking steps 12 and enter the holes 2a, 2b over the first 3 mm of the pushing-together action without the use of force. The two clamp arms 5 with their increasing outer diameter are compressed during entry into the hole 2a, 2b to the hole diameter, whereby the edge collars 11 are also moved radially inward until they are finally still supported only with the outermost edge face thereof on the furniture component 2a, 2b. Consequently, the edge collars 11 are still in abutment at the beginning of the pushing-together action with a large support face against the furniture component 2a, 2b in order to absorb the forces when the double connector 1 is pushed together until the transverse ribs 8 begin to engage in the hole wall. The effective support face of the edge collars 11 becomes smaller as the pushing-together action increases until the support almost completely or completely disappears in order to prevent the formation of a gap between the furniture components 2a, 2b. Therefore, the further the clamp 4a, 4b is located with the central clamp arm 6 in the hole 2a, 2b, the smaller the effective support face of the edge collars is ("disappearing edge scanning").

When the double connector 1 is pushed together, in parallel with the increasingly disappearing edge scanning the two free clamp ends 7 of one clamp 4a, 4b are increasingly spread by the central clamp arm 6 of the other clamp 4b, 4a in each case, whereby the transverse ribs 8 are pressed into the wall of the hole 3a, 3b.

Figure 3B:
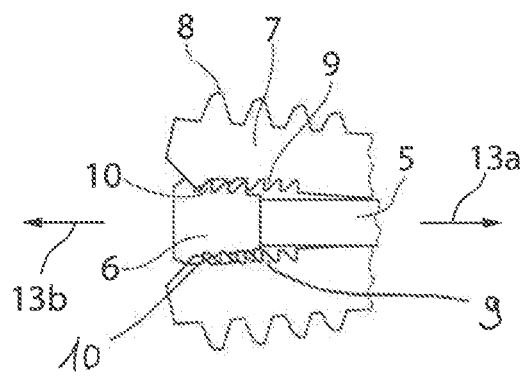

As shown in detail in FIG. 3b, in the assembly position the inner catches 9 of the free clamp ends 7 and the outer catches 10 of the central clamp arms 6 engage one in the other, whereby the two clamps 4a, 4b are locked together and consequently secured against being pushed back. So that the steps of the catch mechanism are as fine as possible, in order to ensure the best possible play suppression for the connection, the outer catches 10 of the central clamp arm 6 which face each other, as shown in FIG. 3b, are offset with respect to each other by half the length of a catch.

The catch mechanism therefore comprises a plurality of inner and outer catches 9, 10 in order to compensate for different extents of pressing of the edge collars 11 into the plate material. With a 90° joint of two furniture components 2a, 2b which are constructed as furniture plates, one hole is located in the plate face of one furniture plate and the other hole is located in the end-side of the second furniture plate. The double connector 1 will be pressed into the end-side hole since there is present here the soft central layer of the chipboard which can afford only little resistance. Since it is not known to what extent the double connector 1 is pressed in, compensation must be provided for this, which is carried out via different positions of the catch mechanism. If there were only one position of the mutual locking, there would be two situations: either the connection wobbles since air is present between the locking members, or the locking position cannot be reached at all if the double connector 1 extends too far into the soft end edge.

Figure 3C:
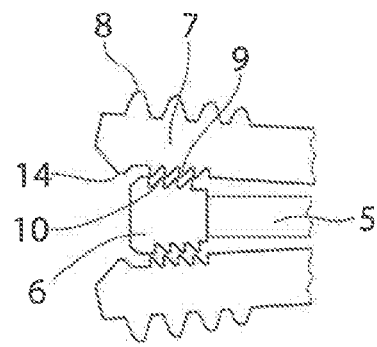

So that the inner and outer catches 9, 10 do not impede the initial mutual insertion of the two clamps 4a, 4b as far as the preassembly position, the two free clamp ends 7 have at the inner sides thereof which face each other a protrusion (nose) 14 (FIG. 3c). The protrusion 14 is arranged upstream of the inner catches 9 in the insertion direction 13a, 13b of the clamp 4a, 4b and protrudes further inward than the inner catches 9. During the initial insertion, the free clamp ends 7 with the protrusions 14 thereof are lifted from the central clamp arm 6 of the other clamp 4b, 4a and thus jump over the outer catches 10 of the central clamp arms 6. The protrusion 14 can be constructed to be so narrow that it is pressed completely flat in the assembly position.

In the assembly position, the two furniture components 2a, 2b are in abutment with each other, wherein the edge collars 11 are located almost completely or completely inside the holes 2a, 2b. The two clamps 4a, 4b are, on the one hand, anchored by the transverse ribs 8 of the spread free clamp ends 7 thereof securely in the hole walls of the items of furniture 2a, 2b and, on the other hand, secured to each other by the inner and outer catches 9, 10 which are locked together so that the two furniture components 2a, 2b are secured to each other. The entire connection assembly of the two furniture components 2, 3 by means of the double connector 1 is consequently carried out in a completely tool-free manner.

The locking steps 12 are used, on the one hand, in the preassembled state as a transport securing system and, on the other hand, in the state inserted at one side as a securing means to prevent the two clamps 4a, 4b from being unintentionally compressed as far as mutual locking, whereby the double connector 1 can no longer be inserted into the other hole and would therefore be unusable. If one of the two clamps 4a, 4b is already inserted in a hole with the free clamp ends 7 thereof, the locking action 12 is reinforced since the free clamp ends 7 are fixed by the hole and cannot deviate outward. The force required to compress the two clamps 4a, 4b is consequently significantly greater when the dowel is already inserted into a hole.

When two furniture components 2, 3 are connected each with a plurality of holes 2a, 3a, double connectors 1 are first inserted in all holes 2a of the first furniture component 2 (for example, of the base of a cupboard) as far as the edge collar 11. Then, the second furniture component 3 (for example, a side portion of the cupboard) is placed with the holes 3b thereof on the double connectors 1 as far as the edge collar 11 and then pressed together until in abutment with the first furniture component 2. The entire connection assembly of the two furniture components 2, 3 using the double connectors 1 is consequently carried out in a completely tool-free manner.

As indicated in FIG. 1, the double connector 1 can be produced with the two clamps 4a, 4b thereof as a one-piece cast component of plastics material, wherein the two clamps 4a, 4b at the end sides of the two free clamp ends 7 thereof are connected to each other integrally by means of a predetermined breaking point 15.

The double connector 21 shown in FIGS. 4 and 5 comprises two connector components in the form of two plug components 22a, 22b which are preferably formed in a structurally identical manner and which each have at one end a plug portion 23 and at the other end a plug receiving portion 24. The plug receiving portion 24 has a base plate 25, two side walls 26 with inner guiding grooves 27, which together with the base plate 25 define a guide channel 28 for the plug portion 23 of the other plug component in each case, and two side flaps 29 which protrude inward into the guide channel 28 and which can be spread with respect to each other. The plug receiving portion 24 with the side flaps 29 thereof forms the first spreadable end portion and the plug portion 23 forms the other second end portion of the connector components. The width B of the plug portion 23 is greater than the clear spacing b of the two side flaps 29 which each have at the outer sides thereof which face away from each other a claw-like transverse rib 30. The plug portion 23 is formed by means of a plug plate 31, wherein the base plate 25 and the plug plate 31 together form a continuous plate.

The plug receiving portion 24 has at the inner side of the base plate 25 thereof both centrally between the two side walls 26 a locking spring (resilient tongue) 32 which protrudes into the guide channel 28 and, at the height of the side flaps 29, two lateral rows of locking protrusions 33 with an inclined approach member 34 which is arranged therebetween. The plug portion 23 also has at the inner side of the plug plate 31 thereof two lateral rows of locking recesses 35 and therebetween a locking recess 36. Furthermore, there is provided between the plug portion 23 and the plug receiving portion 24 at both sides an outer shoulder 37 which is formed as an edge collar.

Figure 6A:
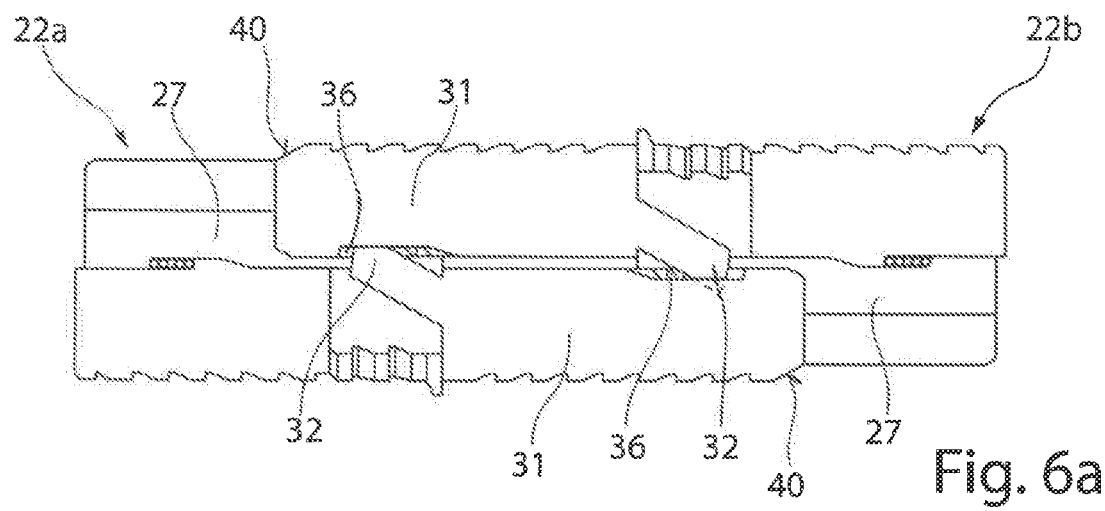
FIGS. 6a-6c are detailed views of the two connector components inserted one inside the other of FIGS. 5a, 5b in the preassembly position (FIGS. 6a, 6b) and in an intermediate position between the preassembly and assembly position (FIG. 6c) as a longitudinal section in each case.
Figure 6B:
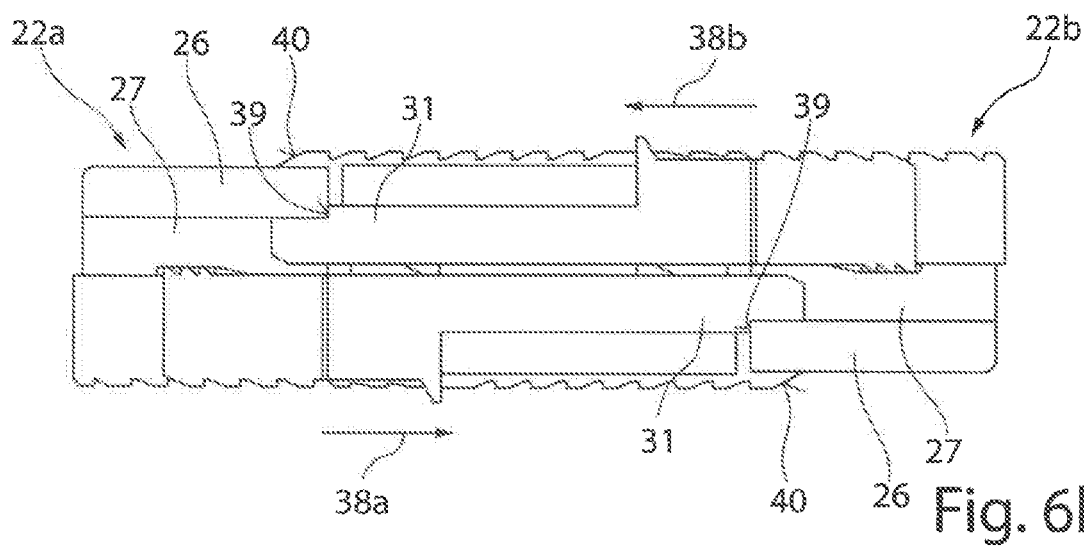

With the plug portions 23 thereof facing each other and being rotated through 90° with respect to each other (FIG. 4), the two plug components 22a, 22b are inserted one into the other with the plug portions 23 in the guide channels 28 of the other plug component 22a, 22b in the insertion direction 38a, 38b as far as a preassembly position (FIG. 5a). In this preassembly position, the locking springs 32 are engaged in the catch recesses 36 of the other plug component 22a, 22b in each case and are thereby prefixed with respect to each other. The locking springs 32 also prevent the preassembled plug components 22a, 22b from being unintentionally pressed together (prevention of incorrect operation). On the one hand, the locking springs 32 engage in the catch recesses 36 and define the position of the preassembly. In addition, however, the remaining resilient force of the locking springs 32 presses apart the two plug components 22a, 22b by 0.5 mm in the transverse direction, that is to say, at right-angles relative to the base plate and plug plate 25, 31 (FIG. 6a) so that the plug portion 23 runs against the end side of the side wall 26 of the other plug component with a shoulder 39 (FIG. 6b) and cannot be introduced further into the guiding groove 27 of the other plug component.

Figure 6C:
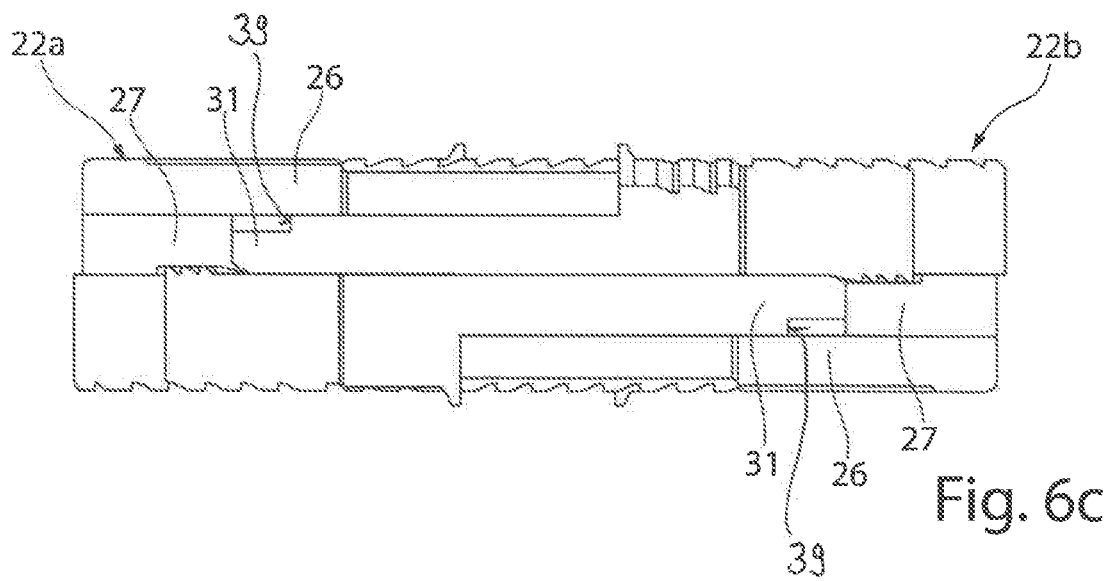

As further shown in FIG. 5a, the preassembled double connector 1 is first inserted with the plug receiving portion 24 of one plug component 22a into the hole 3a of one furniture component 2a and then inserted with the plug receiving portion 24 of the other plug component 22b into the hole 3b of the other furniture component 2b until the plug components 22a, 22b abut with the outer shoulders 37 thereof against the respective furniture component 2a, 2b. That is to say, the holes 3a, 3b are deeper than the plug receiving portions 24 of the plug components 22a, 22b to be inserted therein so that the outer shoulders 37 form a depth stop which limits the insertion. When the double connector 21 is inserted, the plug portions 23 of the two plug components 22a, 22b are inserted with a chamfered introduction member 40 at the front into the holes 3a, 3b, whereby the two plug components 22a, 22b are compressed in the transverse direction to the hole diameter. The blocking of the plug portion 23 in the guiding groove 27 is thereby cancelled, and the two plug components 22a, 22b can be pushed further into each other (FIG. 6c).

Subsequently, the two furniture components 2a, 2b are pushed together until in mutual abutment and the two plug components 22a, 22b are thereby pushed together from the preassembly position in the insertion direction 38a, 38b further into the assembly position thereof (FIG. 5b). When the two plug components 22a, 22b are pushed together, the locking springs 32 are first disengaged from the locking recesses 36 and subsequently the side flaps 29 of one plug component 22a, 22b are spread by the inserted plug portion 23 of the other plug component 22a, 22b in each case, whereby the transverse ribs 30 are pressed into the wall of the hole 3a, 3b. In the assembly position, the locking protrusions 33, 35 of the two plug components 22a, 22b engage in each other, whereby the two plug components 22a, 22b are locked against being pushed back.

When the two plug components 22a, 22b are pushed together, the plug portions 23 lift off with the front end faces 41 thereof on the inclined approach members 34 of the other plug component 22, 22b in each case so that the foremost of the locking protrusions 33, 35 jump over each other as far as the assembly position, then finally all the locking protrusions 33, 35 engage one in the other. Without the inclined approach members 34, when the two plug components 22a, 22b are pushed together, the foremost locking protrusions 33, 35 which meet each other first could become mutually deformed in such a manner that in the assembly position they can no longer engage in other locking protrusions and the mutual locking of the two plug components 22a, 22b is no longer sufficient.

In the assembly position, the two furniture components 2a, 2b are in abutment with each other, wherein the edge collars 37 are completely pressed into the furniture components 2a, 2b. The two plug components 22a, 22b are, on the one hand, securely anchored by means of the transverse ribs 30 of the spread side flaps 29 thereof in the hole walls of the furniture components 2a, 2b and, on the other hand, are secured to each other by the locking protrusions 33 which are locked together so that the two furniture components 2a, 2b are secured to each other. So that the steps of the catch mechanism are as fine as possible in order to ensure the best suppression from play for the connection, the two rows of locking protrusions 33 are each offset by half the length of a catch with respect to each other. The entire connection assembly of the two furniture components 2, 3 by means of the double connector 21 is consequently carried out completely in a tool-free manner.

The catch mechanism therefore comprises a plurality of locking protrusions 33, 35 in order to compensate for differing extents of penetration of the edge collars 37 into the plate material. With a 90° joint of two furniture components 2a, 2b which are constructed as furniture plates, one hole is in the plate face of one furniture plate and the other is in the end side of the second furniture plate. The double connector 21 will press into the end-side hole since the soft central layer of the chipboard is present here, which can afford only little resistance. Since the extent to which the double connector 21 is pressed in is not known, compensation has to be provided therefor which is carried out via different positions of the catch mechanism. If there were only one position of the mutual locking, there would be two situations: either the connection wobbles since air is present between the locking members or the locking position cannot be reached at all when the double connector 21 penetrates too deeply into the soft end edge.

The outer cross-section of the plug components 22a, 22b which have been pushed together corresponds to the hole cross-section of the holes 3a, 3b which are formed in each case by three circular holes which overlap with each other. The combination of three circular holes which overlap with each other has compared with a more complex elongate hole milling operation the advantage that both a production on drilling units with standard tools and a production with hand-operated machines are possible at the assembly location. The two plug components 22a, 22b may be produced from plastics material.

The locking springs 32 act, on the one hand, in the preassembled state as transport securing means and, on the other hand, in the state inserted at one side as a securing means to prevent the two plug components 22a, 22b from being unintentionally pressed together as far as mutual locking, whereby the double connector 21 can no longer be inserted into the other hole and would therefore be unusable.

When connecting two furniture components 2, 3 each having a plurality of holes 2a, 3a, double connectors 21 are first inserted into all holes 2a of the first furniture component 2 (for example, of the base of a cupboard) as far as the edge collar 37. Then, the second furniture component 3 (for example, a side member of the cupboard) is placed with the holes 3b thereof in each case on the double connectors 21 as far as the edge collar 37 and then pressed together until in abutment with the first furniture component 2. The entire connection assembly of the two furniture components 2, 3 using the double connectors 21 is consequently carried out in a completely tool-free manner.

As indicated in FIG. 4, the double connector 21 with the two plug components 22a, 22b thereof may be produced as an integral cast component from plastics material, wherein the two plug components 22a, 22b, for example, at the end sides of their two plug portions 23, are integrally connected to each other by means of a predetermined breaking point (not shown).

The two connector components 4a, 4b or 22a, 22b move synchronously with respect to each other, which has the advantage that the path during the final assembly is halved since the individual components move in a mutually synchronous manner. As a result of the identical connector components, an assembly independent of position is also possible, that is to say, the end user cannot incorrectly assemble the preassembled double connector 1, 21.

Optionally with respect to the pure locking and clawing, glue (for example, casein glue) may also be added in order to make the connection, which is in any case constructed so as not to be able to be disassembled, even more stable. In this instance, the glue is not introduced into the hole, but instead prior to the final assembly directly into corresponding hollow spaces of the connector components 4a, 4b or 22a, 22b. The advantage is a defined position and metering of the glue at locations where it is required. When pushed together (final assembly), the glue is then pressed out. A possible additional gluing is even more important since the plate quality is continuously decreasing (for reasons of cost). In order to ensure the retention of the glue on the double connector 1, 21 without drops, a special low-viscosity glue can be used. The double connector 1, 21 can consequently be used universally with or without the addition of glue, depending on the application.

The double connector 1, 21 can be used not only, as in the embodiments shown, to connect two furniture components 2a, 2b, but universally to connect any two components which may also be different. In principle, applications in automotive or medical technology or other sectors are also possible.

What is claimed is:

1. A two-part double connector fitting for butt-joining two components, the two-part double connector fitting comprising:
    two structurally identical connector components which can be pushed together as far as a locked assembly position and which each connector component comprises:
        a spreadable first end portion for inserting into a hole of a component;
        a second end portion for spreading the first end portion of the other connector component in each case in the assembly position; and
        at least one locking portion for interlocking the two connector components in the assembly position;
    wherein the two connector components are each constructed as a U-shaped clamp having two outer clamp arms with free clamp ends which can be spread with respect to each other and having a central clamp arm which is located there between;
    wherein a thickness of the central clamp arm transversely with respect to a spreading direction of the two outer clamp arms is greater than a clear spacing of the two free clamp ends;
    wherein the two U-shaped clamps in a state rotated through 90° with respect to each other with their respective two outer clamp arms facing one another are inserted one into the other in an insertion direction between their free clamp ends beyond the assembly position and into a preassembly condition, the preassembly condition being where the two free clamp ends of one connector component protrudes beyond the central clamp arm of the other connector component, wherein the two connector components can furthermore be pushed back in a direction opposite the insertion direction from the preassembly condition to the assembly position;
    wherein an overall length of the two-part double connector fitting in the preassembly position is greater than an overall length of the two-part double connector fitting in the assembly position; and
    wherein the overall length of the two-part double connector fitting in the assembly position is the same as a length of each of the connector components individually; and
    wherein the two-part double connector fitting is configured for butt-joining the two components in a tool-free manner.

2. The two-part double connector fitting as claimed in claim 1, wherein the two clamps are locked together in the preassembly position.

3. The two-part double connector fitting as claimed in claim 2, wherein at least one of the two clamps has at the inner sides of the two outer clamp arms thereof facing each other a locking step in which the central clamp arm of the other clamp in each case is locked counter to the insertion direction thereof in the preassembly position.

4. The two-part double connector fitting as claimed in claim 1, wherein each clamp has at the outer sides of the two outer clamp arms thereof facing away from each other an outer shoulder which limits the insertion of the outer clamp arms in the hole of the component.

5. The two-part double connector fitting as claimed in claim 4, wherein the outer spacing of the two clamp arms starting from the outer dimension of the central clamp arm continuously increases as far as the outer shoulder.

6. The two-part double connector fitting as claimed in claim 1, wherein each clamp has at the inner sides of the two outer free clamp arms facing each other at least one inner catch and at the outer sides of the central clamp arm thereof facing away from each other at least one outer catch, wherein in the assembly position the inner and outer catches of the two clamps engage in each other in a locking manner.

7. The two-part double connector fitting as claimed in claim 6, wherein each clamp has at the inner sides of the two free clamp ends thereof facing each other a protrusion which is arranged upstream of the at least one inner catch in the insertion direction and which protrudes inward further than the at least one inner catch.

8. The two-part double connector fitting as claimed in claim 6, wherein each clamp has at the inner sides of the two free clamp ends thereof facing each other a plurality of inner catches which are arranged one after the other in the insertion direction and at the outer sides of the central clamp arm thereof facing away from each other a plurality of outer catches which are arranged one after the other in the insertion direction, wherein in the assembly position at least some of the inner and outer catches of the two clamps engage in each other in a locking manner.

9. The two-part double connector fitting as claimed in claim 1, wherein each clamp has at the outer sides of the two free clamp ends thereof facing away from each other at least one transverse rib.

10. The two-part double connector fitting as claimed in claim 1, wherein the two-part double connector fitting filled with glue.

11. An arrangement comprising two mutually abutting components and the two-part double connector fitting as claimed in claim 1, wherein the two outer clamp arms of the two-part double connector fitting are each inserted into the hole of their respective component and are spread outward therein by the central clamp arms of their adjacent connector components which have been pushed together, wherein the two connector components are locked together.

12. The arrangement as claimed in claim 11, wherein the holes of the two components are each formed by a plurality of mutually overlapping circular holes and wherein the outer cross-section of the two outer clamp arms of the connector components which have been pushed together corresponds to a hole cross-section of the holes of the two components.

13. A double connector for butt-joining two components, the double connector comprising:
two connector components which can be pushed together as far as a locked assembly position and which each connector component comprises:
a spreadable first end portion for inserting into a hole of a component;
a second end portion for spreading the first end portion of the other connector component in each case in the assembly position; and
at least one locking portion for interlocking the two plug components in the assembly position;
wherein the two connector components are each constructed as a U-shaped clamp having two outer clamp arms which can be spread with respect to each other and having a central clamp arm which is located there between;
wherein the thickness of the central clamp arm transversely with respect to the spreading direction of the two outer clamp arms is greater than the clear spacing of the two free clamp ends,
wherein each clamp has at the inner sides of the two outer free clamp arms facing each other at least one inner catch and at the outer sides of the central clamp arm thereof facing away from each other at least one outer catch, wherein in the assembly position the inner and outer catches of the two clamps engage in each other in a locking manner, and
wherein each clamp has at the inner sides of the two free clamp ends thereof facing each other a protrusion which is arranged upstream of the at least one inner catch in the insertion direction and which protrudes inward further than the at least one inner catch.

14. A double connector for butt-joining two components, the double connector comprising:
two connector components which can be pushed together as far as a locked assembly position and which each connector component comprises:
a spreadable first end portion for inserting into a hole of a component;
a second end portion for spreading the first end portion of the other connector component in each case in the assembly position; and
at least one locking portion for interlocking the two plug components in the assembly position;
wherein the two connector components are each constructed as a U-shaped clamp having two outer clamp arms which can be spread with respect to each other and having a central clamp arm which is located there between;
wherein the thickness of the central clamp arm transversely with respect to the spreading direction of the two outer clamp arms is greater than the clear spacing of the two free clamp ends,
wherein each clamp has at the inner sides of the two outer free clamp arms facing each other at least one inner catch and at the outer sides of the central clamp arm thereof facing away from each other at least one outer catch, wherein in the assembly position the inner and outer catches of the two clamps engage in each other in a locking manner, and
wherein each clamp has at the inner sides of the two free clamp ends thereof facing each other a plurality of inner catches which are arranged one after the other in the insertion direction and at the outer sides of the central clamp arm thereof facing away from each other a plurality of outer catches which are arranged one after the other in the insertion direction, wherein in the assembly position at least some of the inner and outer catches of the two clamps engage in each other in a locking manner.

15. A two-part double connector fitting for tool-free butt-joining two components comprising two structurally identical U-shaped clamps which can be pushed together as far as a locked assembly position in which the length of the double connector fitting corresponds to the length of the two clamps, each clamp comprising:
two outer clamp arms which can be spread with respect to each other, for inserting into a hole of a component;
a central clamp arm which is located between the two outer clamp arms, for spreading the two outer clamp arms of the other clamp in each case, the thickness of the central clamp arm transversely with respect to the spreading direction of the two outer clamp arms being greater than the clear spacing of the two free clamp ends; and
at least one locking portion;
wherein the two clamps in a state rotated through 90° with respect to each other with the free clamp ends of one clamp are inserted one into the other between the free clamp ends of the other clamp beyond the later assembly position as far as a preassembly position, in which the free clamp ends of one clamp in the insertion direction thereof protrude beyond the central clamp arm of the other clamp in each case and the length of the double connector fitting is greater than in the assembly position; and wherein the two clamps can be pushed together from the preassembly position back into the assembly position, in which the two clamps are interlocked by the at least one locking portion.

* * * * *